United States Patent
Luo et al.

(10) Patent No.: US 6,952,286 B2
(45) Date of Patent: Oct. 4, 2005

(54) DOUBLEPRINT PHOTOFINISHING SERVICE WITH THE SECOND PRINT HAVING SUBJECT CONTENT-BASED MODIFICATIONS

(75) Inventors: Jiebo Luo, Pittsford, NY (US); Robert T. Gray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 894 days.

(21) Appl. No.: 09/732,503

(22) Filed: Dec. 7, 2000

(65) Prior Publication Data

US 2002/0093670 A1 Jul. 18, 2002

(51) Int. Cl.⁷ .......................... G06K 15/00; G06T 5/00; H04N 1/407; H04N 1/409; H04N 1/387
(52) U.S. Cl. .................... 358/1.9; 382/254; 358/3.27; 358/452; 358/453
(58) Field of Search ..................... 396/3; 428/195.1; 359/885; 352/66, 86, 38; 353/5; 382/309, 272, 254, 173, 276, 181, 190, 263, 264, 274, 255–6, 203, 192, 199; 345/418; 360/32; D14/389; 430/541, 495.1, 570, 486, 501.1; 358/3.27

(56) References Cited

U.S. PATENT DOCUMENTS

| | | | | |
|---|---|---|---|---|
| 5,333,549 A | * | 8/1994 | Feldman | 101/483 |
| 5,611,027 A | * | 3/1997 | Edgar | 345/853 |
| 5,978,100 A | * | 11/1999 | Kinjo | 358/453 |
| 6,038,011 A | * | 3/2000 | Ikenoue et al. | 355/40 |
| 6,057,931 A | * | 5/2000 | McConnell et al. | 358/1.9 |
| 6,654,506 B1 | * | 11/2003 | Luo et al. | 382/282 |
| 6,714,314 B1 | * | 3/2004 | Ueda | 358/1.15 |

* cited by examiner

*Primary Examiner*—Kimberly Williams
*Assistant Examiner*—Charlotte M. Baker
(74) *Attorney, Agent, or Firm*—Milton S. Sales; Mark G. Bocchetti

(57) ABSTRACT

A method is disclosed for providing photofinishing services for images having a main subject and background, comprising the steps of producing a digital image of a customer's photographic image; producing a main subject belief map from the digital image; employing the main subject belief map to produce a modified digital image; producing a print of the digital image; producing a print of the modified digital image; and delivering both prints to the customer. The step of employing the main subject belief map to produce a modified digital image includes zoom and crop steps that maintain a main subject within a resulting cropped image. The step of employing the main subject belief map to produce a modified digital image may include a subject emphasizing step. The emphasizing step may include the step of maintaining the main subject in color and the background in black and white, the step of altering the background by reduced brightness to produce a spotlight effect on the main subject, and/or the step of altering the background with reduced sharpness. The step of employing the main subject belief map to produce a modified digital image may include the step of altering pixel values that are a part of the main subject and/or altering pixel values that are a part of the background.

8 Claims, 5 Drawing Sheets

DOUBLEPRINT PHOTOFINISHING SERVICE WITH THE SECOND PRINT HAVING SUBJECT CONTENT-BASED MODIFICATIONS

CROSS REFERENCE TO RELATED APPLICATIONS

Reference is made to commonly assigned U.S. patent applications Ser. No. 09/490,915 filed Jan. 25, 2000, entitled "Method for Automatically Creating Cropped Versions of Photographic Images" by Jiebo Luo et al., and Ser. No. 09/642,533 filed Aug. 18, 2000, entitled "Digital Image Processing System and Method for Emphasizing a Main Subject of An Image" by Jiebo Luo et al.

FIELD OF THE INVENTION

The present invention relates to digital photofinishing services, and more particularly to providing novel doubleprints enabled by automatic subject content analysis and digital image processing.

BACKGROUND OF THE INVENTION

Conventionally in photofinishing, a multiple print service is provided to consumers when they drop their film rolls for processing at a photofinishing service provider. The advantage to consumer is that they can obtain two copies of the same picture at a much reduced cost, and more conveniently, than by ordering reprints later on. Reprints require more (usually manual) processing, so multiple print service is advantageous to both consumers and the photofinishing service providers.

A potential drawback with the conventional multiple print service is that, in general, not all the pictures in a film roll are worth having two prints. Many images may not have been properly exposed, composed, or timed.

Many pictures can be improved by applying a certain amount of cropping so that the main subject is more emphasized and background clutter is removed. Even for those that were reasonably composed, a certain amount of cropping can offer a new perspective for the pictured scene or event.

One problem with the conventionally multiple print service is that both prints are identical. For sharing with friends and relatives, it is perfect. However, there is also need for generating "fun" and "trendy" looking pictures that may not be an exact capture of the original scene. Possibly, one might want to make the second, black and white print of a color first print. Perhaps a Sepia print would be desired as the second print. Neither of these processes would require scene content analysis.

There are other, perhaps more attractive ways of making the second print more interesting. For example, in the motion picture "Pleasantville", there are scenes where the main people subjects are in color while the background is in black and white. Another example is simulated depth of the field, where the background is intentionally blurred to emphasize the foreground main subject. Such a modified print with one or more special effects applied, provided along with the original untouched print in a doubleprint set, can be of value to consumers. However, such a photofinishing service would be enabled only by means of an automatic way of segmenting the foreground main subject from the background. In addition, the results tend to be very sensitive to the correctness of the foreground/background segmentation if a binary mask is used.

The advent of digital imaging opened a new era in photofinishing. Within the wholesale and retail photofinishing industry, digital photofinishing began to take center stage. Films will be scanned so all the pictures are in digital format, opening doors for digital image processing and newer, better photofinishing services. One of such newer services is the doubleprint, which is essentially a multiple print with one of the prints having modifications according to subject content.

In the digital age, new ways of providing services emerge. Kiosk is a platform where consumers can bring old prints, film cartridges, memory cards or digital cameras as the source for making prints. Although in this case consumers have total control over what prints and how many prints to order (therefore do not have to stick to the paradigm of multiple prints), consumers surely can find the above mentioned modified prints valuable.

Internet ushered in yet another way of photofinishing. On-line picture fulfillment is the latest addition to photofinishing service family. Clearly, consumers have the flexibility to order all kinds of prints, including the above mentioned modified versions of the original pictures.

Furthermore, such modified pictures can be generated right within a digital camera once the requirements on memory and computing power are met by the camera design.

Therefore, there is a need for an automatic, error-tolerate way of producing modified prints based on subject content analysis.

DISCLOSURE OF THE INVENTION

It is an object of the present invention to provide an automatic, error-tolerate method of producing modified versions of the original pictures according to an analysis of the subject content of the photographic image.

According to a feature of the present invention, a method of providing photofinishing services includes the steps of: producing a digital image of a customer's photographic image; processing the digital image to produce a main subject belief map; processing the digital image to produce a modified digital image employing the main subject belief map; producing a print of the digital image; producing a print of the modified digital image; and delivering both prints to the customer.

According to another feature of the present invention, method of providing photofinishing services for images having a main subject and background, comprising the steps of producing a digital image of a customer's photographic image; producing a main subject belief map from the digital image; employing the main subject belief map to produce a modified digital image; producing a print of the digital image; producing a print of the modified digital image; and delivering both prints to the customer.

In a preferred embodiment of the present invention, the step of employing the main subject belief map to produce a modified digital image includes zoom and crop steps that maintain a main subject within a resulting cropped image. The step of employing the main subject belief map to produce a modified digital image may include a subject emphasizing step. The emphasizing step may include the step of maintaining the main subject in color and the background in black and white, the step of altering the background by reduced brightness to produce a spotlight effect on the main subject, and/or the step of altering the background with reduced sharpness. The step of employing the main subject belief map to produce a modified digital image may include the step of altering pixel values that are a part of the main subject and/or altering pixel values that are a part of the background.

It will be apparent to those skilled in digital image processing that creating more than one modified "look" and delivering one or more prints of all looks is a logical possibility within the scope of the present invention.

ADVANTAGES

The present invention has the advantage that, unlike the conventional multiple print service where both prints are identical, the second print is a modified version of the first original print according to the subject content of the photographic image. In addition, subject content analysis and image modifications are performed automatically, and artifacts due to errors in content analysis are not noticeable and objectionable.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
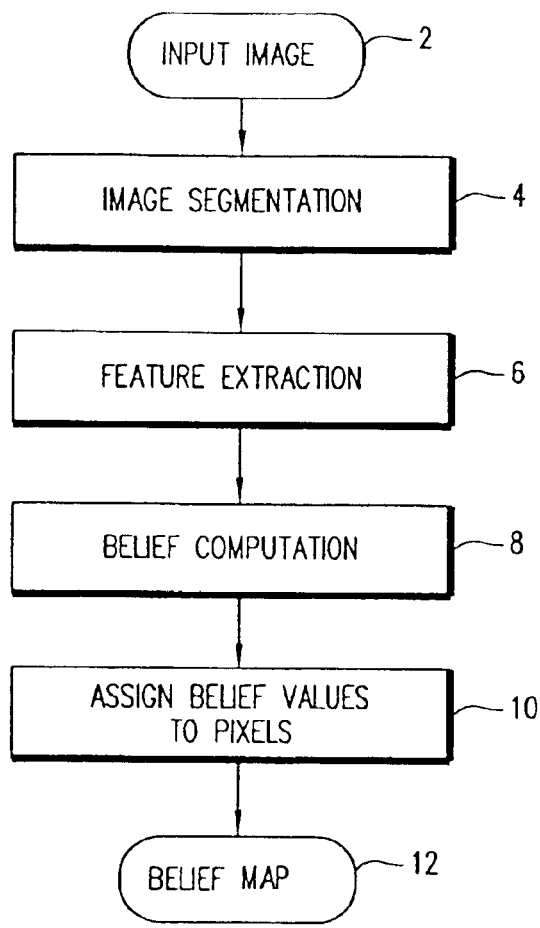
FIG. 1 is flow chart showing the step of generating the main subject belief map in the present invention.

The present description will be directed in particular to elements forming part of, or cooperating more directly with, apparatus in accordance with the present invention. It is to be understood that elements not specifically shown or described may take various forms well known to those skilled in the art.

The present invention provides a method of automatically detecting the main subject of an image and then automatically altering the value of pixels in the image to produce an altered image that emphasizes the image subject. This automation provides a fundamental advantage of eliminating the need for manual intervention. In digital photofinishing, this method could be used to produce a double set photographic prints. A first set of prints in which the pixel values are unmodified, thereby producing a 'normal' photographic print, and, a second set of prints in which the pixels have been modified to emphasize or enhance the main subject of the print to produce a set of 'fun' prints.

There are a number of ways in which the main subject of an image can be emphasized. For example, the main subject can be emphasized by reducing the color saturation of the background to black and white while leaving the main subject at its original color saturation levels. Alternatively, the background can remain at its original color saturation levels while the color saturation of the main subject is enhanced to create an emphasis effect. Of course, a combination of changing the saturation of the main subject and background can be used.

According to the present invention, a gradient of belief values (that is, importance map) are calculated. The belief values are related to the confidence a particular image region is the main subject rather than a background subject. By utilizing a gradient or 'continuously valued' main subject belief map, emphasis can be applied to the main subject so a gradual transition from the main subject to the background occurs, whereby artifacts resulting from the main subject emphasis are less noticeable and therefore less objectionable to an observer.

Because there is a gradient of belief values, threshold levels can be selected to distinguish main subject from background, or to set a plurality of threshold levels, such as main subject, secondary subject, and background subject. With this in mind, it is understood that the image saturation levels, or any other pixel characteristic, could be set to three or more levels, thereby emphasizing each of these areas in a different way. As an example, the main subject could have enhanced saturation levels, the secondary subject could have normal saturation levels, and the background could have zero saturation levels, rendering that section in black and white.

In another advantageous use of the gradient of belief values, the image need not be divided by threshold levels into sections, but each gradient step of belief values may become a section in and of itself. In this way, the pixel values may be adjusted according to these gradients producing an image where the desired emphasis follows this gradient. An example is an image where pixels assigned the highest belief value are altered to enhance the saturation and pixels assigned intermediate belief values are each gradually reduced in saturation level until pixels with the lowest belief values have zero, or black and white, saturation values. As will be discussed more fully hereinafter, this advantage of the present invention is important in mitigating the probability that the definition of the belief values will differ somewhat from the subjected interpretation a particular viewer of the image may have as to what the main subject of the image actually is.

Saturation level adjustment is just one way to alter an image to emphasize the main subject. In digital imagery, the pixel values can be defined in several ways, including the primary color values red, green, and blue. The pixel values can also be defined in terms of hue, saturation, and luminance. Other systems have and can be conceived to define a pixel value. Transformation calculations are used to shift the between these systems. Such a transformation can be expressed as:

$$(hue^{original}, saturation^{original}, luminance^{original}) = T(r^{original}, g^{original}, b^{original})$$

where r, g, and b express red, green and blue pixel values respectively.

The present invention contemplates the adjustment of any of these values, or combinations of these values to emphasize the main subject in a binary fashion, or according to the aforementioned gradient approach. As an example, the main subject may be emphasized by increasing its level of luminance in the altered image. Similarly, the background sections may be de-emphasized by reducing their levels of luminance.

Respecting adjustments to hue, the main subject can be emphasized by adjusting its hue according to the belief value. The hue may be inverted in the main subject, or the background subject, to create a positive/negative effect which emphasizes the main subject. Also, the hue value may be altered according to a gradient of belief values.

Reference is directed to FIG. 1, which is a flow diagram showing how the main subject belief values are assigned to pixels in an image. An image described by a plurality of pixels is input at Step 2. The image is first segmented into homogenous regions at Step 4 by analysis of the color or texture of each region. At Step 6, features are extracted, which may include structural or semantic features of the image. The process conducts a belief computation at Step 8 based, in part, on the extracted feature information, and then assigns belief values to pixels at Step 10. The same belief value is assigned to all pixels within each region. The resultant information is compiled into a belief map for the image at Step 12. The belief map therefore contains data in the belief value for all pixels in the image on a region by region basis as well as data on the location of each region. The system of main subject detection in a consumer-type photographic image from the perspective of a third-party observer is described in commonly assigned, co-pending U.S. patent application Ser. No. 09/223,860 filed to U.S. Patent and Trademark Office on Dec. 31, 1998. The disclosure of which is hereby incorporated by reference thereto.

Main subject detection provides a measure of saliency or relative importance for different regions that are associated with different subjects in an image. This is the aforementioned gradients of belief values assigned to pixels in an image.

Conventional wisdom in the field of computer vision, which reflects how a human observer would perform such tasks as main subject detection and cropping, calls for a problem-solving path via object recognition and scene content determination according to the semantic meaning of recognized objects.

With respect to the present invention and the reference incorporated by reference, the main subject detection system is built upon mostly low-level vision features with semantic information integrated whenever available. This main subject detection system has a number of sub-tasks, including region segmentation, perceptual grouping, feature extraction, and probabilistic reasoning. In particular, a large number of features are extracted for each segmented region in the image to represent a wide variety of visual saliency properties, which are then input into a tunable, extensible probability network to generate a belief map containing a continuum of values.

Using main subject detection, regions that belong to the main subject are generally differentiated from the background clutter in the image. Thus, selective emphasis of main subjects or de-emphasis of background becomes possible. Automatic subject emphasis is a nontrivial operation that was considered impossible for unconstrained images, which do not necessarily contain uniform background, without a certain amount of scene understanding. In the absence of content-driven subject emphasis, conventional systems rely on a manually created mask to outline the main subject. This manual procedure is laborious and has been used in movie production studios. However, it is not feasible to use a manual procedure for commercial mass photo finishing for consumers.

Again, referring to FIG. 1, an input image is segmented in Step 4 into a few regions of homogeneous properties, such as color and texture. The regions are evaluated for their saliency in terms of two independent but complementary feature types; structural features and semantic features. For example, recognition of human skin or faces is semantic while determination of what stands out generically is categorized as structural. Respecting structural features, a set of low-level vision features and a set of geometric features are extracted. Respecting semantic features, key subject matter frequently seen in photographic pictures are detected. The evidences from both types of features are integrated using a Bayes net-based reasoning engine to yield the final belief map of the main subject. For reference on Bayes nets, see J. Pearl, *Probabilistic Reasoning in Intelligent Systems*, Morgan Kaufmann, San Francisco, Calif., 1988, the contents of which are hereby incorporated by reference thereto.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so called gold-partition positions or rule of a thirds.

It should be understood that the centroid of the region alone may not be sufficient to indicate the location of a region with respect to the entire image without any indication of its size and shape of the region. The centrality measure is defined by computing the integral of a probability density function over the area of a given region. The probability density function is derived from the "ground truth" data, in which the main subject regions are manually outlined and marked by a value of one and the background regions are marked by a value of zero, by summing the ground truth maps over an entire training set. In essence, the probability density function represents the distribution of main subjects in terms of location. The centrality measure is devised such that every pixel of a given region, not just the centroid, contributes to the centrality measure of the region to a varying degree depending on its location. The centrality measure is defined as:

$$centrality = \frac{1}{N_R} \sum_{(x,y) \in R} PDF_{MSD\_Location}(x, y)$$

where PDF is the probability density function; (x,y) denotes a pixel in the region R; and $N_R$ is the number of pixels in region R.

If the orientation is unknown, the probability density function is symmetric about the center of the image in both vertical and horizontal directions, which results in an orientation-independent centrality measure. If the orientation is known, the probability density function is symmetric about the center of the image in the horizontal direction but not in the vertical direction, which results in an orientation-dependent centrality measure.

Another structural feature is borderness. Many background regions tend to contact one or more of the image borders. Therefore, a region that has significant amount of its contour on the image borders is more likely to belong to the background then to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: none, one border, two borders, two facing borders, three or four borders that the region contacts. The more contact a region has with a border increases the likelihood that the regions is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the region is in contact with. Using the definition of "in contact with" from above, the four borders of the image are labeled as "Top", "Bottom", "Left", and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would mean the region has a negative area, or a portion of the region exists outside the image area, which would be unknown for any arbitrary image. Since such a fraction cannot exceed one-half, the following definition is used to normalize the feature value to a range from zero to one.

$$\text{Borderness}_2 = 2 \times (\text{number\_of\_region\_perimeter\_pixels\_on\_image}_{13} \text{ border})/(\text{number\_of\_region\_perimeter\_pixels})$$

One of the semantic feature is human skin. According a study of a photographic image database of over 2000 images, over 70% of the photographic images have people and about the same number of images have sizable faces in them. Thus, skin tones are common in images. Indeed, people are the single most important subject in photographs. Therefore, an algorithm that can effectively detect the presence of skin tones is useful in identifying the main subject of an image.

In the present invention, the skin detection algorithm utilizes color image segmentation and a pre-determined skin distribution in a specific chrominance space, as: P(skin\chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance. For reference see Lee, "Color image quantization based on physics and psychophysics," Journal of Society of Photographic Science and Technology of Japan, Vol. 59, No. 1, pp. 212–225, 1996, which is hereby incorporated by reference thereto. The skin region classification is based on maximum probability according to the average color of a segmented region, as to where if falls within the predefined chrominance space. However, the decision as to whether a region is skin or not is primarily a binary one. Utilizing a gradient of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task, is to determine the likelihood of a given region in the image being the main subject based on the posterior probability of:

P(main subject detection\feature)

In an illustrative embodiment of the present invention, there is one Bayes net active for each region in the image. Therefore, the probabilistic reasoning is performed on a per region basis (instead of per image).

In an illustrative embodiment, the output of main subject detection algorithm is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map. Because of the gradient of belief values employed in the belief map, the belief map is more than a binary map that only indicates location of the determined main subject. The associated likelihood is also attached to each region so that the regions with large values correspond to regions with higher confidence, or belief, that it is part of the main subject.

To some extent, this belief map reflects the inherent uncertainty for humans to perform such a task as main subject detection because different observers would likely disagree on certain subject matter while agreeing on other subject matter in terms of which are main subjects. This illustrates a problem in binary main subject determinations. The subjective perception of each observer influences the apparent accuracy of the main subject detection algorithm. It is therefore impossible to detect the main subject exactly correctly because what is correct is held only in the opinion of each observer, which opinion varies from observer to observer. However, a binary decision, when desired, can be readily obtained by using an appropriate threshold on the belief map, where regions having belief values above the threshold are arbitrarily defined as main subjects and those below the threshold are arbitrarily defined as background regions.

In several of the embodiments of the present invention, a binarized main subject belief map is not used for determination of main subject emphasis. A subject belief map having a gradient of belief values has been found to better avoid making a bad decision that is visually objectionable to certain observers. This aspect of the present invention identifies a substantial advantage thereof in that the emphasis process can be gradual, mitigating the sense that the main subject was inaccurately identified. Furthermore, using the gradient of belief values of the main subject helps conceal the artifacts introduced by an inaccurate determination of main subject and the background. A binary decision on what to include and what not to include, once made, leaves little room for error. For example, even if portions of the main subject are not assigned the highest belief, with a gradual (as opposed to binary) saturation emphasizing process, it is likely they would retain a close level of saturation and blend, less noticeably, with the rest of the main subject. In other words, if an undesirable binary decision on what to include/exclude is made, there is no recourse to correct the mistake. Consequently, the emphasizing result becomes sensitive to the robustness of the automatic main subject detection algorithm and the threshold used to obtain the binary decision. With a gradient-valued main subject belief map, every region or object is associated with a likelihood of being emphasized or de-emphasized. Moreover, secondary main subjects are indicated by intermediate belief values in the main subject belief map, and can be somewhat emphasized according to a descending order of belief values while the main subject of highest belief values are emphasized the most.

Figure 2:
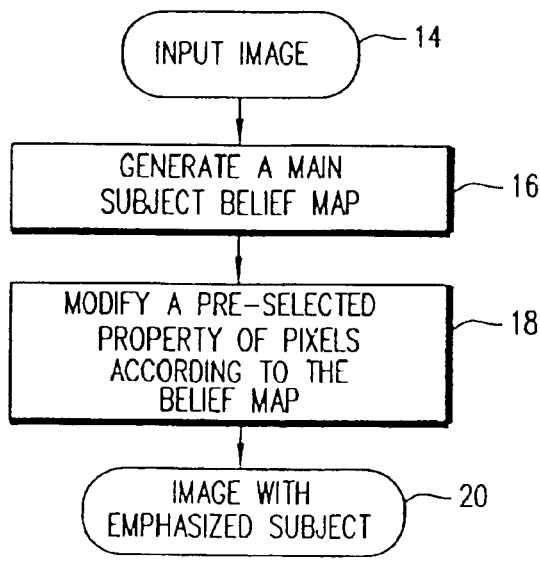
FIG. 2 is a flow chart showing the steps in the method of the present invention according to a first embodiment.

Referring to FIG. 2, which is a flow diagram of the first illustrative embodiment of the present invention. At Step 14 an image comprising pixels is input to the process that generates a belief map at Step 16 for the image as has been described hereinbefore. The belief map serves as a reference for the modification of selected properties of the pixel color values at Step 18. The modified image is output at Step 20.

The present invention contemplates that any of the pixel color properties may be altered in accordance with the gradient of belief values generated during the creation of the main subject belief map. In the hue, saturation, and luminance model for color definition, and of the hue, saturation and luminance values could be altered. The pixels in the regions having the highest belief values will be altered to the extreme opposite extent as those pixels in the regions having the lowest belief values. All those regions falling between the two extremes will have pixel modifications that fall in the continuum between the two extremes. The present invention contemplates 256 discrete belief values ranging from zero to 255. However, it is understood that any number or discrete belief values could be used, and that powers of two are preferable due to the nature of computations and data storage in a digital computer.

By way of example, and not limitation, the modification of pixel saturation values in proportion to the belief map values will be described. It is understood that a similar analysis would be appropriate for either the hue or luminance parameters. Color digital images may be created using digital cameras, convention film cameras, or directly from computers running image or graphic generating software programs. In the case of conventional film cameras, the film is scanned using a digital scanner to create a digital representation of the film images. In the vast majority of situations, the images are created with the three color, or red, green, blue color model. Therefore, the pixel values in such images can be described by:

$$(r^{original}, b^{original}, g^{original})$$

By color conversation transformation, as is well understood in the art, the red, blue, green model is transformed to the hue, saturation, luminance model through the transformation:

$$(hue^{original}, saturation^{original}, luminance^{original}) = T(r^{original}, g^{original}, b^{original})$$

A controlling function determines the proportionality of the subsequent emphasizing transformation. Examples of the controlling functions are:

proportional: $f(belief) = a \times belief + f_0$ inverse proportional $f(belief) = a/belief + f_0$ where $f_0$ is a predetermined offset. The emphasizing transform then is:

$$saturation^{new} = saturation^{original} \times f(belief)$$

Having completed the emphasizing transformation, the hue, saturation, and luminance values are transformed back to red, blue, green values so that the data is made ready for subsequent processing, such as electronic display, printing, or other communication to a separate entity. The inverse color transform is:

$$(r^{new}, g^{new}, b^{new}) = T^{-1}(hue^{original}, saturation^{new}, luminance^{original})$$

Figure 3:
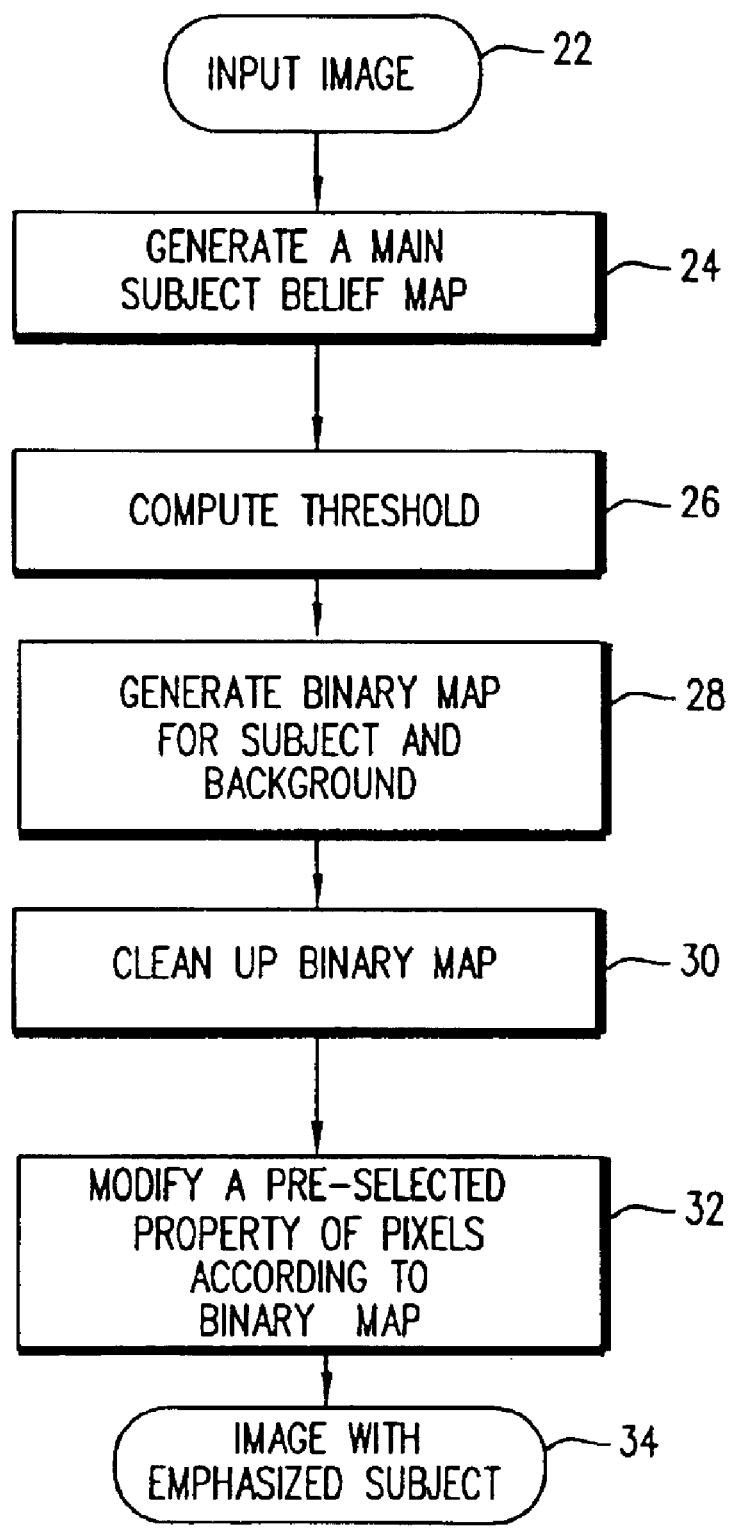
FIG. 3 is a flow chart showing the steps in the method of the present invention according to an alternative embodiment.

Reference is directed to FIG. 3, which is a flow diagram of the second illustrative embodiment of the present invention. At Step 22 an image comprising pixels is input to the process, which generates a main subject belief map at Step 24 as has been described hereinbefore. A threshold belief value is computed at Step 26. The threshold may also be set arbitrarily, or derived from empirical data so as to select a reasonable value that discriminates between the main subject and background subjects at a reasonable level. In the illustrative embodiment, belief values range from zero to one. Selecting a mean point between the two is likely to be over inclusive of background subject matter because the background usually occupies the majority of the image area.

At Step 28, a binary map is generated based on the belief map values as compared against the computed threshold. The binary map will identify each region as either main subject or background in a binary fashion. At Step 30, the binary map is cleaned of artifacts and other inconsistencies, in the form of isolated small regions, by employing a median filtering operation. The median filtering operation is understood by those skilled in the art.

At Step 32, certain pre-selected properties of pixels are modified in accordance with the binary map. At Step 34, the image with emphasized main subject is output from the process.

It is clear that at Step 32, any number of pre-selected properties could be used in the modification process. By way of example, and not limitation the pre-selected property of background saturation will be used to more fully develop this illustrative embodiment.

The color transform is first accomplished for the entire image by:

$$(hue^{original}, saturation^{original}, luminance^{original}) = T(r^{original}, g^{original}, b^{original})$$

Next, the luminance value for each pixel in a region identified as a background region is calculated. The color values are replaced with the luminance values for these pixels according to the emphasizing transformation:

$$saturation^{new} = \begin{cases} 0 & belief <= threshold \\ saturation^{original} & otherwise \end{cases}$$

Finally, the inverse color transform is applied:

$$(r^{new}, g^{new}, b^{new}) = T^{-1}(hue^{original}, saturation^{new}, luminance^{original})$$

Figure 4:
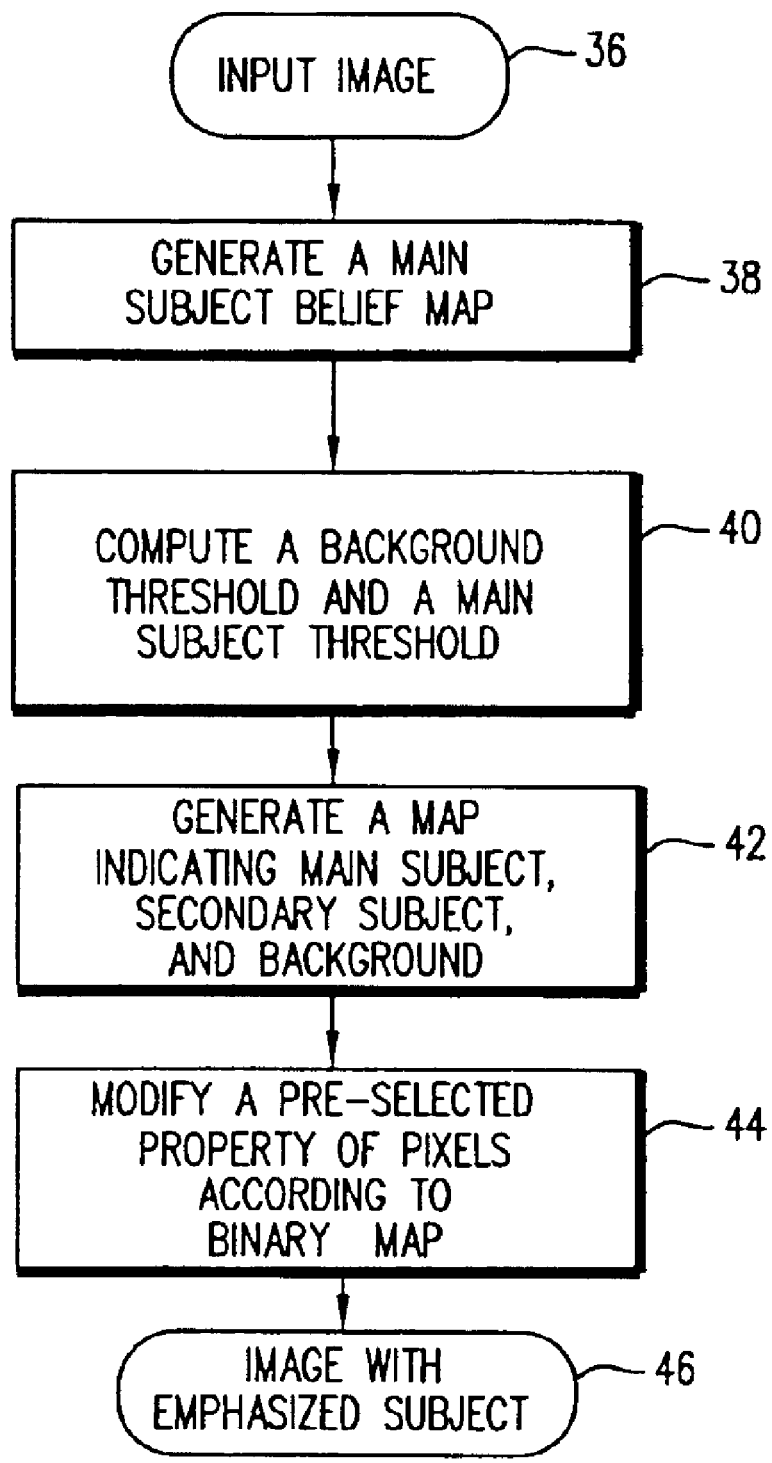
FIG. 4 is a flow chart showing the steps in the method of the present invention according to a further alternative embodiment.

Reference is directed to FIG. 4 which is a flow diagram of the third illustrative embodiment of the present invention. At Step 36 an image comprising pixels is input to the process which generates a main subject belief map at Step 38 as was described hereinbefore. A background threshold and a main subject threshold are computed at Step 40. This step differs from the previous illustrative embodiment in the there are two thresholds. The background threshold sets the maximum belief value for regions that will be deemed to be background. Likewise, the main subject threshold sets the minimum belief value for regions that will be deemed as main subjects. The regions associated with belief values that fall between the background threshold and the main subject threshold are neither background nor main subject and will be treated separately in the emphasizing function. Rather, these regions are called secondary subject regions.

A map is generated at Step 42 which assigns one of three values to each region indicated whether such region is a background region, a secondary subject region or a main subject region. At Step 44, certain pre-selected properties of the pixels in the images are modified according to the map created in Step 42. Finally, at Step 46, the emphasized image is output for subsequent processing or utilization.

It is clear that at Step 44, any number of pre-selected properties could be used in the modification process. By way of example, and not limitation, the pre-selected property of color saturation will be used to more fully develop this illustrative embodiment.

First, the color transform is calculated as:

$$(\text{hue}^{original}, \text{saturation}^{original}, \text{luminance}^{original}) = T(r^{original}, g^{original}, b^{original})$$

The belief values are re-mapped according to the computed belief values according to the controlling function:

proportional: $f(\text{belief}) = (\text{belief} - \text{belief}_{min})/(\text{belief}_{max} - \text{belief}_{min}) + f_0$ inverse proportional
$f(\text{belief}) = (\text{belief}_{max} - \text{belief}_{min})/(\text{belief} - \text{belief}_{min}) + f_0$ where $f_0$ is a predetermined offset.
And remapped per:

$$\text{belief} = \begin{cases} \text{belief}_{min} & \text{belief}^{original} <= \text{threshold}_{background} \\ \text{belief}_{max} & \text{belief}^{original} >= \text{threshold}_{mainsubject} \\ \text{belief}^{original} & \text{otherwise} \end{cases}$$

$\text{belief}_{min} = \text{threshold}_{background}$, $\text{belief}_{max} = \text{threshold}_{mainsubject}$ With this transform, the minimum belief value is set for all regions with a belief value less than the background threshold value, which sets those regions to black and white. Similarly, the regions having belief values greater than the main subject threshold value are set to the maximum belief value causing these regions, which are the main subject, to be remapped as hyper-saturated regions. The remaining regions that fall between the two thresholds retain their original belief values and are mapped accordingly.

All of the pixels having been remapped as to belief values, the emphasizing transform is processed to assign the new color values:

$$\text{saturation}^{new} = \text{saturation}^{original} \times f(\text{belief})$$

And finally, the inverse color transform is processed to produce the output, main subject emphasized image:

$$(r^{new}, g^{new}, b^{new}) = T^{-1}(\text{hue}^{original}, \text{saturation}^{new}, \text{luminance}^{original})$$

In addition to varying the color characteristics of the pixel in an image to emphasize a main subject, other aspects of the image can be varied to achieve a similar emphasis effect. These include, but are not limited to, region focus, region depth of field, region contrast, and region sharpness. By way of example, and not limitation, what follows is a discussion on blurring the background regions out of focus for the purpose of emphasizing the main subject, which remains in focus and has no blurring effect applied thereto.

The process of blurring a region comprises the steps of determine a background threshold and a main subject threshold value for the belief map, computing a blur value for each pixel in the image, and modifying the blur values of pixels in the digital image according to the belief values in such a way that the sharpness of main subject pixels is retained or increased, while the sharpness of the background is reduced, thereby blurring the background.

A blur value of a pixel can be computed using a blur kernel of size 3×3 pixels, centered at the current pixel. The blur values of all pixels are obtained by convolving the kernel with the original image. Those who are skilled in the art can select any kernel of low-pass filtering characteristic and of any size to achieve desired effect. In the case of a 3×3 blur kernel, a suitable blur value matrix (to be normalized by a factor of 1/16) is:

$$\begin{bmatrix} 1 & 2 & 1 \\ 2 & 4 & 2 \\ 1 & 2 & 1 \end{bmatrix}$$

The processes disclosed in the present invention are generally accomplished automatically by a computer. This is consistent with the area of technology that deals with digital image processing in general. As such, any of a variety of computer systems and implementations could be used to accomplish the present invention.

The source of digital images may come from digital cameras which may store the images in an internal memory, or may have a removable RAM memory device for transferring digital images, or may utilize a storage medium such as a floppy disk, CD-ROM, or utilize a cable interface to another digital computer. Digital images may come from the scanning of conventional film exposed in a conventional camera and processed in the conventional manner. Digital images may also be entirely man-made though use of a computer. In any event, a digital file containing one or more digital images is ultimately transferred into a memory in a digital computer for processing.

An important feature of the present invention is the high level of automation and the general elimination of user input in the emphasizing process. The only selection to be made is as to what kind of emphasizing is desired. Such as turning the background to black and white, or hyper-saturating the main subject, or inverting the main subject to a negative image, or brightening the main subject and so on. In any case, the identification of the main subject, secondary subjects and background subjects is automated. So is the process of transforming the pixel data and applying the emphasizing functions and transforms. The input and output procedures can be automated as well.

The physical implementation can be on a personal computer running a software application that implements the emphasizing process. A user would transfer one or more digital images into the personal computer and store them in the computer memory or mass storage device. The type of emphasizing function could be present or selected by the user. The emphasizing processes would be accomplished by the central processing unit of the personal computer and the resultant emphasized image would be stored as a separate file in the computer memory or mass storage device. Once stored, the image could be output to the display for viewing, or transferred to another device or printed on a printer.

In a similar vein, the software application could be implemented as a feature in another software application so as to create an added value feature. For example, there are a number of commercially available digital imaging editing programs which allow a broad range of manual photo editing features. Such a software application would benefit from having the automated emphasizing processes incorporated as a new feature to such software.

In another embodiment, the emphasizing process could be implemented on a centralized computer system where the users provide digital image files thereto. For example, digital image files could be transferred via the Internet to the centralized processor where the emphasizing process would take place. Alternatively, users could deliver storage media and an operator at the centralized computer location would transfer the user's digital image files into a memory of the computer. The resultant emphasized files would be returned via the Internet, or delivered to a digital image printer for printing. The resultant printed images would be delivered to the user.

For a more localized commercial approach, the computer could be located in a kiosk or mini-lab machine. Consumers would deliver their digital images in one of the aforementioned manners and the kiosk or minilab machine would accomplish the emphasizing process and make photographic prints on an internal printer. The finished prints then are delivered to the consumer. The user may have a choice of not only receiving one or more enhanced versions of the images, but the unemphasized prints as well.

It is also useful to emphasize existing photographic prints. For example, a user could select one or more prints out of the family photo album and these prints could be scanned emphasized and printed in emphasized form by one of the aforementioned computer systems.

Figure 5:
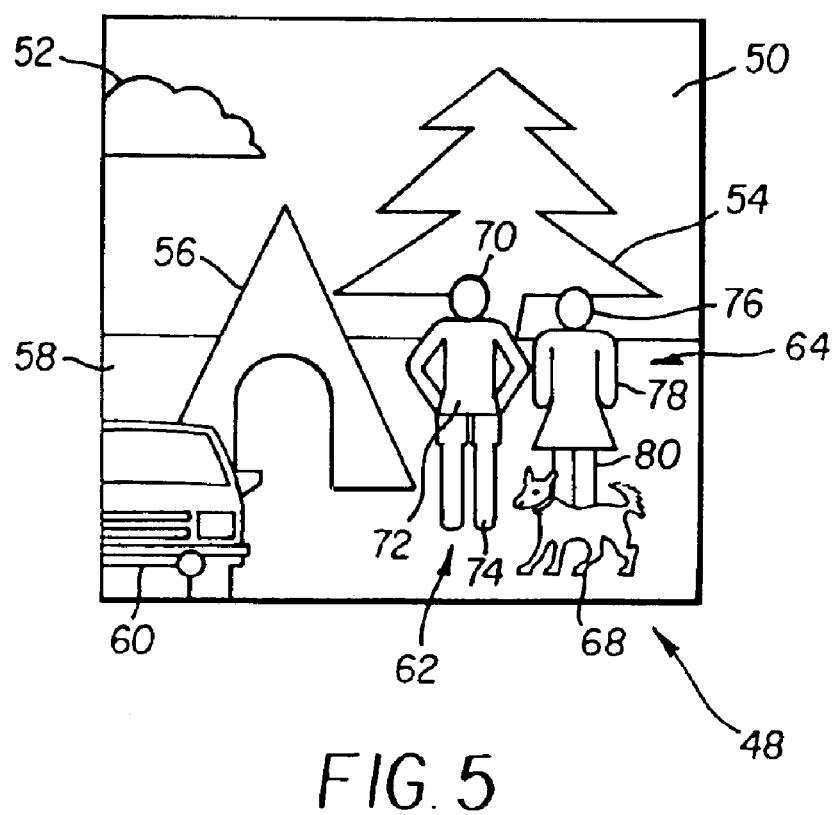
FIG. 5 is a schematic of a photograph used in describing the present invention.

In application, an image may have a greatly varying number of homogenous regions. This could range from a tightly cropped head-shot portrait with a uniform background to a distant landscape/cityscape with a huge number of picture elements. Computers are uniquely qualified to handle such repetitive analytical tasks. Reference is directed to FIG. 5 which is a schematic diagram of an exemplary digital image processing by the present invention. The digital image 48 comprises a number of regions. Generally filling the frame in this example are the sky 50 and ground 58. In the sky 50 are clouds 52. A tree 54 stands on the ground 58. A tent 56 is in view as well as a portion of an automobile 60. A man 62 and woman 64 are standing with a dog 68 in the foreground. The primary issue in processing this image for emphasis is the question as to what the main subject is. From a subjective point of view one might argue that it is a picture of two people. Another might argue that it is a picture of a campsite. Still another that it is a landscape picture. What is correctly the main subject is very much dependent upon this subjective inquiry.

From the perspective of the present invention, image 48 is already segmented according to regions of homogeneous color or texture. The schematic nature of FIG. 5 depicts this. The faces 70 and 76, respectively, of the man and woman are identified by the semantic quality skin. The structural relationship of the man's clothing 72 and 74 tie them to face 70. Similarly, the woman's clothing 78 is tied to her face 76. Her legs 80 may be of skin tone or clothed. These regions would all receive a relatively high belief value under the present invention. Under the borderness constraints, sky 50 and ground 58 would be assigned relatively low belief values because each contact three borders of the image. The automobile 60 would receive the second lowest belief value as it is on contact with two borders. The next higher belief value would be assigned to clouds 52 as they are in contact with one border. This leaves tree 54, tent 56, and dog 68, which would all be assigned intermediate values, called secondary subject values. The dog may receive a slightly higher belief value depending on its color, or whether its close proximity to the regions of the people cause it to be structurally associated therewith.

From this analysis, the belief values would be assigned, in the order from highest to lowest, to people 62 and 64, dog 68, tent 56, tree 54, cloud 52, automobile 60, sky 50, and ground 58. Assuming that an emphasizing algorithm that adjusts color saturation is selected and utilizes two threshold values for background and main subject, the emphasized image would appear as follows. The both people 62 and 64, and perhaps dog 68 would appear in a hyper-saturated color. Car 60, tent 56, tree 54, and cloud 52 would retain their original color, and, ground 58 and sky 50 would appear in a reduced saturation form, perhaps black and white.

Taking this from the perspective of the subjective observers mentioned above, the individual who thought of this as a portrait of two people would be satisfied in that the people in the image would have been plainly emphasized by the process of the present invention. The observer that viewed this as an image of a campsite would be fairly satisfied as the basic element of the campsite; tent 56, tree 54, as well as the people, dog, and car would be rendered in color. Perhaps the observer that viewed this image as a landscape would be less satisfied, however, the elements of reduced saturation, the sky and the ground are of somewhat reduced importance, even in a landscape image. It is understood that the present inventions serves the function of emphasizing a main subject quite effectively, especially in view of the subjective differences that multiple observes have over any given image.

An alternative choice for the modified print is a cropped version of the original picture. For determination of crop, the present invention again uses the main subject belief map instead of a binarized mask to avoid making a bad cropping decision that is irreversible. Furthermore, using the continuous values of the main subject beliefs helps trade-off different regions under the constraints encountered in cropping. A binary decision on what to include and what not to include, once made, leaves little room for trade-off. For example, if the main subject region is smaller than the crop window, the only reasonable choice, given a binary main subject map, is to leave equal amounts of margin around the main subject region. On the other hand, secondary main subjects are indicated by lower belief values in the main subject belief map, and can be included according to a descending order of belief values once the main subject of highest belief values are included. Moreover, if an undesirable binary decision on what to include/exclude is made, there is no recourse to correct the mistake. Consequently, the cropping result becomes sensitive to the accuracy of the binary mask. With a continuous-valued main subject belief map, every region or object is associated with a likelihood of being included or a belief value in its being included. Detail of the automatic cropping method is disclosed in commonly assigned U.S. patent application Ser. No. 09/490, 915, filed Jan. 25, 2000, entitled "Method for Automatically Creating Cropped Versions of Photographic Images" by Jiebo Luo et al. In general, it is beneficial to limit the amount of cropping to retain over 50% of the area of the uncropped picture. Extreme cropping is rarely needed and usually makes an automatic algorithm vulnerable to catastrophic cropping errors.

Using the same sample example, the cropping process of the present invention generates a cropped version that retains both of the people 62 and 64, and perhaps the dog. A portion of the tent 56, the tree 54 will be retained to provide necessary context. The car 60, the cloud 52, the sky 50, and the rest of the background objects will be cropped out. Taking this from the perspective of the subjective observers mentioned above, this cropped picture would in general appeal to most consumers.

Figure 6:
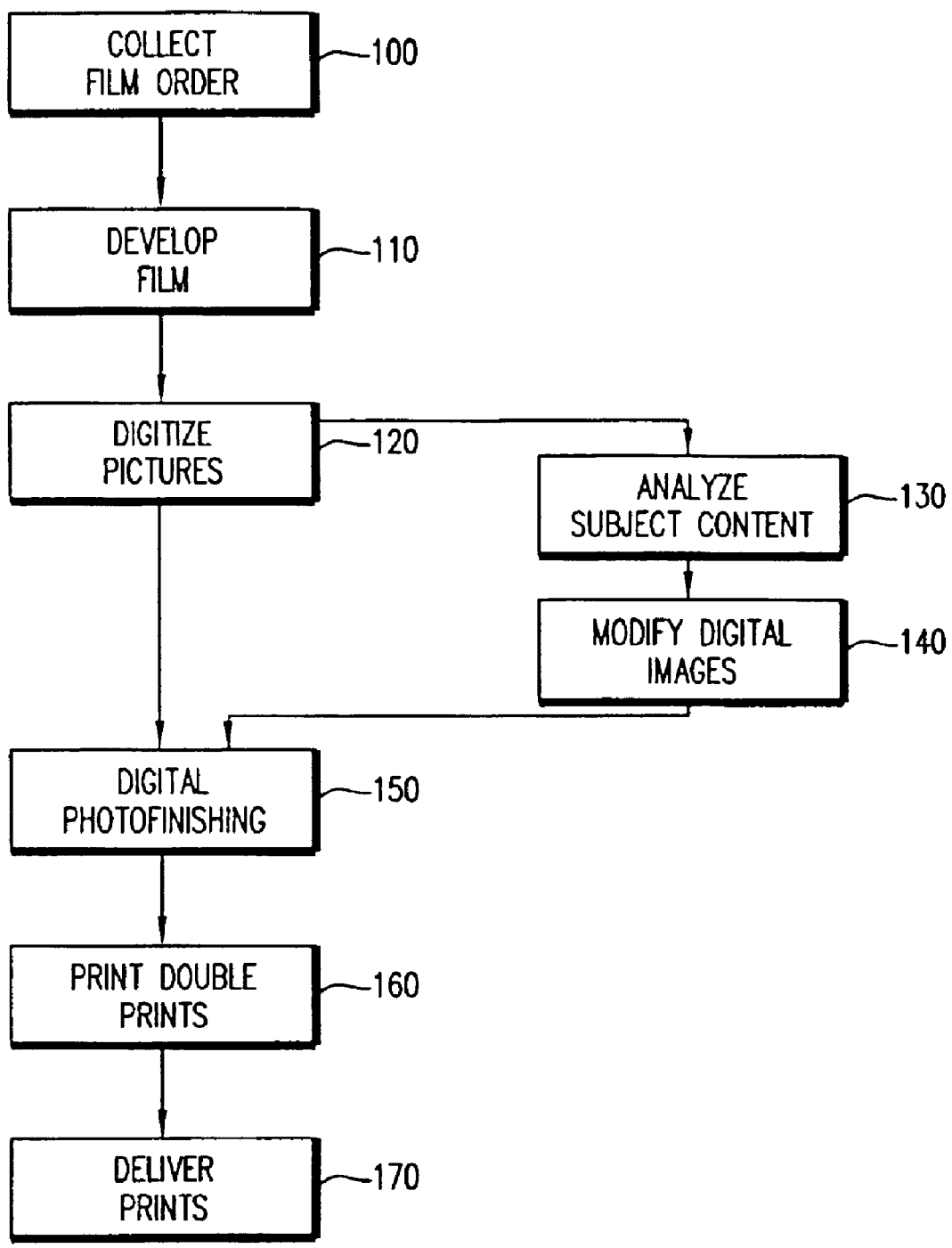
FIG. 6 is a black diagram of a photofinishing service providing system according the present invention.

Referring to FIG. 6, there is shown a block diagram of a photofinishing service providing system according to the present invention. Exposed film orders are collected at Step 100 and developed at Step 110. Pictures are digitized at Step 120 to produce digital images. Digital images are analyzed for subject content at Step 130 and modified at Step 140 as required by a consumer when the film order is dropped. Both the unmodified and modified digital images are processed by digital photofinishing operations 150 such as exposure compensation, sharpening, and noise reduction. Finally double prints are made at Step 160 and delivered to the consumer at Step 170.

Other digital photofinishing services that do not involve films, such as kiosk and on-line services, follow a similar procedure.

The invention has been described in detail with particular reference to preferred embodiments thereof, but it will be understood that variations and modifications can be effected within the spirit and scope of the invention. For example, more than one modified "look" can be created, and one or more prints of all looks can be delivered to the customer.

What is claimed is:

1. A method of providing photofinishing services for images having a main subject and background, comprising the steps of:

obtaining a digital image of a customer's image;

producing a main subject belief map from the digital image;

employing the main subject belief map to produce a modified digital image, the employing step including zooming and cropping that maintain a main subject within a resulting cropped image;

producing a print of the digital image;

producing a print of the modified digital image; and delivering both prints to the customer.

2. A method of providing photofinishing services for images having a main subject and background, comprising the steps of:

obtaining a digital image of a customer's image;

producing a main subject belief map from the digital image;

employing the main subject belief map to produce a modified digital image, the employing step including a subject emphasizing step;

producing a print of the digital image;

producing a print of the modified digital image; and delivering both prints to the customer.

3. The method as set forth in claim 2, wherein the subject emphasizing step includes the step of altering the background with reduced sharpness.

4. The method as set forth in claim 2, wherein the subject emphasizing step includes the step of maintaining the main subject in color and the background in black and white.

5. The method as set forth in claim 2, wherein the subject emphasizing step includes the step of altering the background by reduced brightness to produce a spotlight effect on the main subject.

6. A method of providing photofinishing services for images having a main subject and background, comprising the steps of:

obtaining a digital image of a customer's image;

producing a main subject belief map from the digital image;

employing the main subject belief map to produce a modified digital image, wherein the employing step includes altering pixel values that are a part of the main subject;

producing a print of the digital image;

producing a print of the modified digital image; and delivering both prints to the customer.

7. The method as set forth in claim 6, wherein the step of employing the main subject belief map to produce a modified digital image also includes altering pixel values that are a part of the background.

8. A method of providing photofinishing services for images having a main subject and background, comprising the steps of:

obtaining a digital image of a customer's image;

producing a main subject belief map from the digital image;

employing the main subject belief map to produce a modified digital image, wherein the employing step includes altering pixel values that are a part of the background; producing a print of the digital image;

producing a print of the modified digital image; and delivering both prints to the customer.

* * * * *